Figure 1:
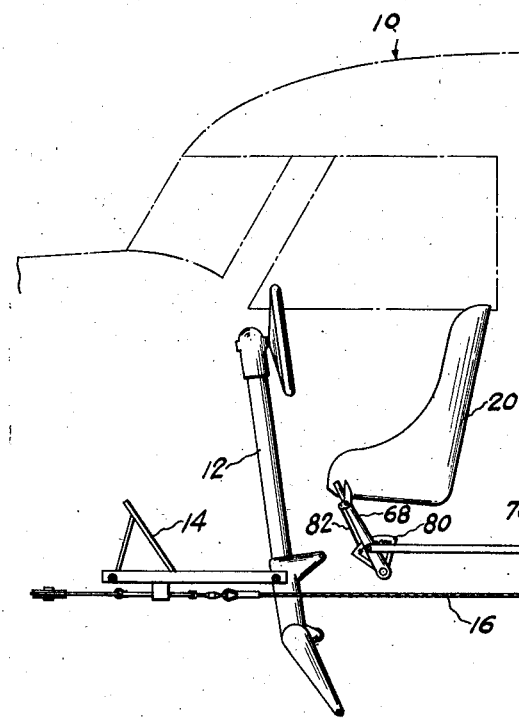

Feb. 13, 1940.  I. I. SIKORSKY  2,190,340
AIRPLANE CONTROL
Filed Dec. 22, 1937  2 Sheets-Sheet 1

INVENTOR.
Igor I. Sikorsky
BY Harris G. Luther
ATTORNEY

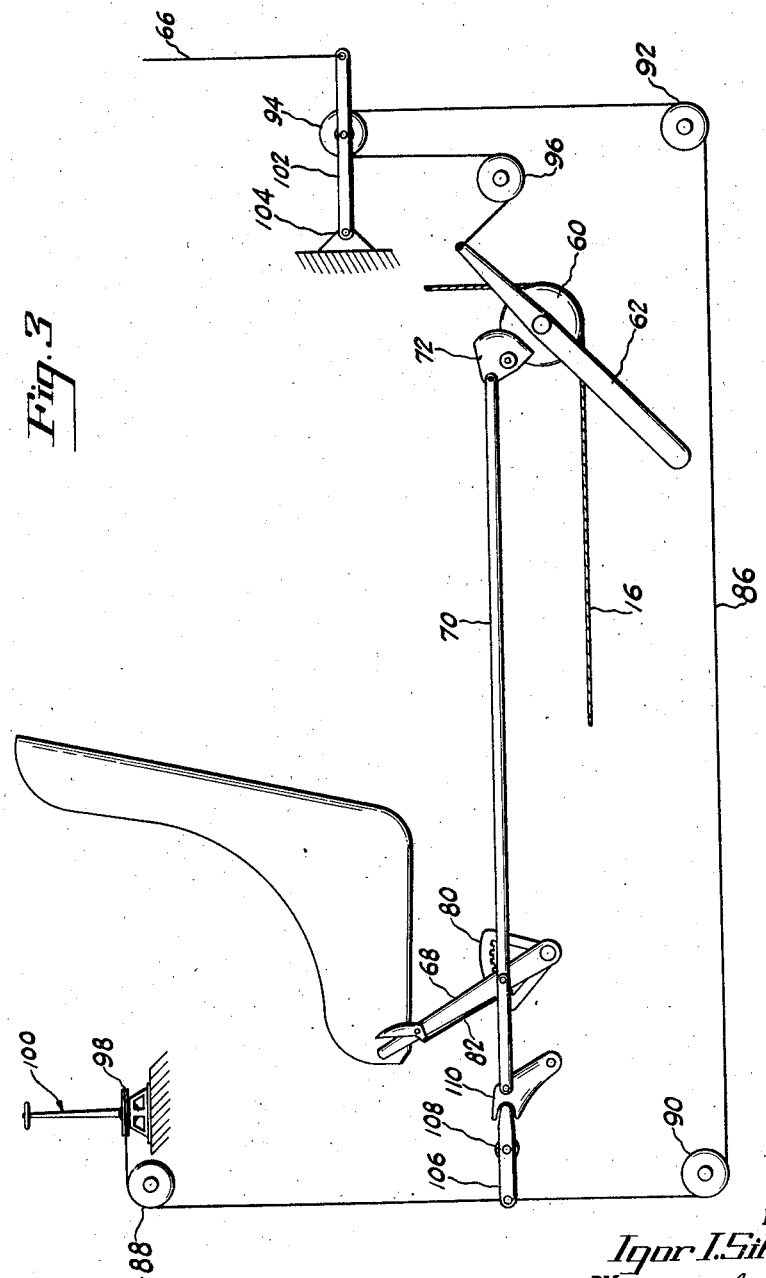

Patented Feb. 13, 1940

2,190,340

UNITED STATES PATENT OFFICE 2,190,340

AIRPLANE CONTROL

Igor I. Sikorsky, Trumbull, Conn., assignor to United Aircraft Corporation, East Hartford, Conn., a corporation of Delaware Application December 22, 1937, Serial No. 181,173

6 Claims. (Cl. 244—82)

This invention relates to improvements in aircraft control means and has particular reference to an improvement in servo-mechanisms for moving or operating under control of the pilot or for assisting the pilot of an aircraft in manipulating or operating one or more of the aircraft flight control surfaces, lift increasing devices, the landing gear or any other movable or operable instrumentality forming a part of or carried by the aircraft.

An object of the invention resides in the provision of an improved servo-mechanism driven by the relative wind of flight of the aircraft when operative, and producing only negligible drag increase when inoperative.

A further object resides in the provision of an operative connection for a servo-mechanism of the character described, so arranged that the servo-mechanism may be used to move or assist in moving or operating one or more of the above mentioned instrumentalities forming a part of or carried by the aircraft or may be entirely disengaged from the manual controls for moving or operating such instrumentalities.

A still further object resides in the provision of a servo-mechanism of the character indicated, so constructed and arranged that the instrumentality or instrumentalities to which it is connected may be moved or operated by a manually operable pilot or pencil type control.

Other objects and advantages will be more particularly pointed out hereinafter or will become apparent as the description proceeds.

In the accompanying drawings in which like reference numerals are used to designate similar parts throughout, there is illustrated, in two somewhat modified forms, a suitable embodiment of what is now considered to be a preferred application of the invention. The drawings, however, are for the purpose of illustration only and are not to be taken as limiting or restricting the scope of the invention.

In the drawings, Fig. 1 is a somewhat schematic side elevational view of a fragmentary portion of an airplane control mechanism showing a servo-mechanism constructed according to this invention applied thereto.

Figure 2:
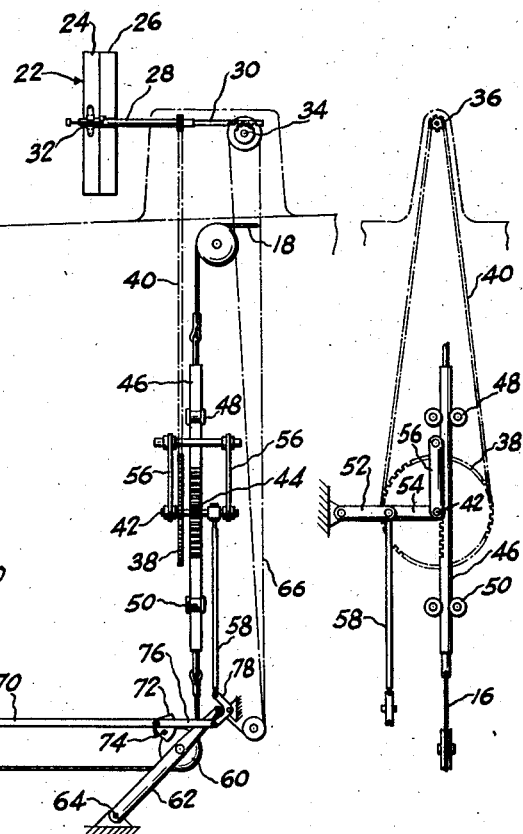

Fig. 2 is an end elevational view of the servo-mechanism illustrated in Fig. 1, and Fig. 3 is a somewhat schematic illustration of a modified form of control mechanism utilizing a servo-mechanism of the form illustrated in Figs. 1 and 2.

Referring to the drawings in detail, the aircraft, a fragmentary portion of which is generally indicated by the numeral 10, may be provided with the conventional control surfaces such as ailerons on the wings to control the lateral stability or rolling movements of the airplane, elevators on the tail group or empennage at the rear of the airplane to control the vertical stability or pitching movements of the airplane, and a rudder, also on the tail group or empennage, for controlling the directional stability of the aircraft. In the conventional aircraft these various control surfaces are connected for independent movement to manually operable controls. In the usual construction the control column 12 controls the ailerons and the elevators and the rudder is moved by means of a rudder bar or a pair of foot-operated pedals 14, connected to the rudder by suitable means such as the control cable, two portions of which are indicated at 16 and 18. The pilot seat 20 is located in a position convenient to the control elements 12 and 14 and has disposed adjacent thereto other indicating and control instrumentalities necessary or convenient to the operation of the aircraft.

The servo-mechanism may comprise a wind-driven motor, located in some position in which its vanes will be in the wind stream flowing past the aircraft, and a motion reducing gear connecting the wind-driven motor with the instrumentality to be moved or operated, or with the connection leading to such instrumentality. Obviously, such a servo-mechanism may be connected with any one of or any number of the control surfaces or other instrumentalities with which the aircraft is provided to assist the manual effort exerted by the pilot to move such control surface or surfaces, or to itself move such surface or surfaces under pilot control.

In the form of the invention illustrated, the vanes, generally indicated at 22, each comprise a relatively fixed member 24 and a relatively movable member 26, which may be inclined in either direction with respect to the fixed member to impart to the wind-driven motor a rotation in either direction desired. When the movable portion is in alignment with the fixed portion in the direction of air flow, the motor will not rotate and will impose a minimum and negligible drag on the forward progress of the aircraft. The vanes are mounted upon a suitable rotatable shaft, as indicated at 28, and the movable portions may be inclined with respect to the fixed portions by suitable means such as the rod 30 which extends through the hollow shaft 28 and is connected at one end by means of suitable links and levers 32 with the movable vane portions 26 and has at its opposite end a rack and pinion device 34 for imparting vane inclining longitudinal movements thereto. The shaft 28 may be provided with a suitable sprocket gear 36 connected with another, and preferably a larger sprocket gear 38 by means of a drive chain 40. The sprocket gear 38 is mounted upon a shaft 42 which carries a pinion 44 having gear teeth meshing with teeth provided on a rack bar 46 interposed between the two portions 16 and 18 of the control cable. The rack bar may be suitably supported for longitudinal movements by means of the spaced pairs of rollers 48 and 50 and the shaft 42 is preferably supported on a linkage arrangement including parallel co-extensive pairs of links 52, 54 and 56. A control rod 58 is connected to the pivotal connection between the pairs of links 52 and 54 so that longitudinal movement of the rod 58 in one direction, for instance downwardly, will move the pinion 44 out of mesh with the teeth on the rack bar 46, and movement of the control shaft in the other direction will restore the pinion to its meshing relation with the teeth on the rack bar.

In the arrangement shown by way of example in Figs. 1 and 2 the servo-mechanism is arranged to assist in the control of the aircraft rudder. In this arrangement the control cable 16, leading from the foot pedals, passes over pulleys, one of which is shown at 60, each mounted upon a movable pivot carried by a lever as shown at 62, having a fixed pivotal connection at 64. The free ends of the levers 62 are connected to the ends of a cable 66 which is operatively connected intermediate its length with the rack and pinion arrangement 34. Movements of the foot pedals 14 to control the aircraft rudder will exert a force on the pulleys 60 which will cause the levers 62 to swing about their pivotal connections 64, applying a force to the cable 66 which in turn actuates the rack and pinion mechanism 34 and inclines the movable portions 26 of the wind motor vanes with respect to the fixed portions 24. The wind motor 22 thereupon starts to rotate and its force is added to the manual effort exerted upon the pedals 14 by reason of the connection through the sprockets 36 and 38 and the rack and pinion device including the elements 44 and 46.

At times it may become desirable to discontinue the operation of the servo-motor and rely entirely upon manual effort to control the aircraft. At such times it is also desirable to completely free the manual control mechanism from the wind-driven servo-mechanism so that the manual effort exerted upon the control surfaces will not be diminished by an amount necessary to move the servo-mechanism or by friction in the servo-mechanism connection. For this purpose there is provided a manually controllable lock-out mechanism including the manually operable lever 68 located in a position convenient to the pilot seat 20 and connected by suitable means, such as the link 70, with cam members 72 mounted on fixed pivots 74, and shaped, when in one position, to bear against the levers 62 and restrain the levers against movement. The link 70 is also connected through an additional link 76 and bell crank lever 78 with the rod 58 so that movement of the manual lever 68 will lock the levers 62 in fixed position and simultaneously move the pinion 44 out of mesh with the teeth on the rack bar 46 thereby entirely freeing the manual control from the servo-mechanism. The manual lever 68 has two operative positions in either of which it may be locked by suitable means such as the toothed quadrant 80 and latch mechanism 82.

In the somewhat modified form of the invention illustrated in Fig. 3 provision has been made for a form of manual control usually referred to as a pilot or pencil type control. In this arrangement when the manual lever 68 is in the position illustrated in Fig. 3 of the drawings, the control may be the same as that illustrated in Figs. 1 and 2 when the servo-motor is operatively connected into the control mechanism. Under these conditions tension on either of the cables 16 will act on the respective one of the pulleys 60 to swing the associated lever 62 to move the control cable 66 to actuate the wind-driven servo-motor in the proper direction of rotation. In this form of the device the cable 66 is divided into two parts, a second part of which has been indicated at 86 in Fig. 3. The cable portion 86 is led over additional pairs of pulleys 88, 90, 92, 94 and 96 and has its ends connected to the free ends of the levers 62 and its mid-portion wound upon a drum 98 carried by the pencil control mechanism generally indicated at 100. The pulleys 94 are carried upon respective pivots located intermediate the length of respective lever members 102, one end of each of which is pivoted on a fixed support 104 and the other end connected to the respective end of the control cable 66. When the manually controlled lever 68 is in the position illustrated, a pivoted lever member 106, connected at its free end to an intermediate part in the length of the cable 86, is restrained against rotation about its pivotal mounting 108 by means of a lock 110 operatively associated with the handle 68 so that the cable 86 cannot move. Under these conditions movement of the levers 62 will impose a reactive force between the respective pairs of pulleys 96 and 94 causing the pulleys 94 to move and to thereby move the cable 66.

When the manual lever 68 is moved to the opposite side of its quadrant 80, the lever 106 is released and the cams 72 are moved to lock the respective levers 62 against movement. Under these conditions movement of the pencil or pilot control 100 will move the cable 86 and, since the ends of the cable 86 connected to the levers 62 are fixed, will impose a reactive force between the pairs of pulleys 94 and 92 thereby moving the pulleys 94 and the cable 66 to actuate the servo-mechanism. With the arrangement illustrated in Fig. 3 the control may be either by the usual manual control assisted by the servo-mechanism or may be alternatively by the servo-mechanism under the control of the pilot or pencil control device or by the manual control alone when the pilot control is operative but not utilized. In the latter case the pencil control will be usually fixed in its neutral position by some adequate mechanism.

In the arrangement shown in Fig. 3 the direct manual control may be entirely omitted and the pencil control alone relied upon for moving or operating the particular instrumentality through the medium of the servo-mechanism. In such an arrangement it would, in many cases, be desirable to mount the servo-mechanism on or closely adjacent to the instrumentality to be moved or operated and to connect the servo-mechanism to the instrumentality by means of a relatively short irreversable drive. Only a very light connection would then be necessary between the pencil control and the servo-mechanism.

While there has been illustrated and described in two somewhat modified constructional embodiments a suitable application of the idea of the invention, it is to be understood that the invention is in no way limited to the constructional forms so illustrated and described but that such changes in the size, shape and arrangement of parts may be resorted to as come within the scope of the subjoined claims.

Having now described the invention so that others skilled in the art may clearly understand the same, what it is desired to secure by Letters Patent is as follows:

1. In combination with a vehicle provided with movable control instrumentalities and movable through the air at a speed sufficient to drive a wind-motor, a wind-driven servo-mechanism for operatively moving one or more of said instrumentalities, means actuated by manual effort for operatively moving the same instrumentalities, pilot means for controlling said servo-mechanism, an operative connection between said manually actuatable means said servo-mechanism and the control instrumentalities movable thereby, effective to actuate said servo-mechanism to assist the manual effort applied to said manually actuatable means to move said instrumentalities, and selective means effective to disrupt the operative connection between said manually actuatable means and said servo-mechanism to render said control instrumentalities movable by manual effort exclusively or movable by said servo-mechanism exclusively under control of said pilot means.

2. In an aircraft having a movable control surface, manually actuatable means for moving said control surface, a wind-driven servo-mechanism, a connection between said servo-mechanism and said manually actuatable means for applying power developed by said servo-mechanism to move said control surface, means for moving the vanes of said servo-mechanism to render the same operative, and manually controllable means for disrupting said connection and locking said vane moving means while leaving said manually actuatable means free to move said control surface.

3. In an aircraft having a movable control surface, manually actuatable means for moving said control surface, a wind-driven servo-mechanism, a connection between said servo-mechanism and said manually actuatable means for applying power developed by said servo-mechanism to move said control surface, manually operable pilot means for actuating said servo-mechanism to move said control surface in either direction and to a desired extent, and manually controllable means for rendering said pilot means operative or inoperative.

4. In an aircraft having a movable flight control element, manually actuatable means for moving said element by the application of manual effort, a controllable wind-driven servo-motor, a connection between said servo-motor and said manually actuatable means for applying the power developed by said servo-motor to assist said manual effort, a second connection between said manually actuatable means and said servo-motor to control said servo-motor in accordance with the application of manual effort to said manually actuatable means, a manually operable pilot control associated with said second connection, and manually controllable means for changing the operation of said second connection to render said servo-motor responsive to the application of manual effort to said manually actuatable means or to manipulation of said pilot control while retaining at all times an operative connection between said manually actuatable means and said flight control element.

5. In an aircraft having a movable flight control element, manually actuatable means for moving said element by the application of manual effort, a wind-driven servo-motor having movably mounted blades controlled by the application of manual effort to said manually actuatable means to apply the power developed thereby to assist said manual effort, and manually controllable means for locking said servo-motor against rotation with said blades in their minimum drag position.

6. In an aircraft having a movable flight control element, manually actuatable means for moving said element by the application of manual effort, a wind-driven servo-motor controlled by the application of manual effort to said manually actuatable means to apply the power developed thereby to assist said manual effort, and a manually operable pilot control for controlling said servo-motor independently of said manually actuatable means to move said flight control element entirely by the power developed by said servo-motor.

IGOR I. SIKORSKY.